(12) United States Patent
Ohkuma

(10) Patent No.: US 11,228,058 B2
(45) Date of Patent: Jan. 18, 2022

(54) FLOW BATTERY, FLOW BATTERY SYSTEM, AND CONTROL METHOD

(71) Applicant: KYOCERA CORPORATION, Kyoto (JP)

(72) Inventor: Takeshi Ohkuma, Kyoto (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 17/050,783

(22) PCT Filed: Apr. 26, 2019

(86) PCT No.: PCT/JP2019/018074
§ 371 (c)(1),
(2) Date: Oct. 26, 2020

(87) PCT Pub. No.: WO2019/208809
PCT Pub. Date: Oct. 31, 2019

(65) Prior Publication Data
US 2021/0098830 A1    Apr. 1, 2021

(30) Foreign Application Priority Data

Apr. 27, 2018  (JP) .............................. JP2018-087778

(51) Int. Cl.
| | | |
|---|---|---|
| *H01M 10/26* | (2006.01) | |
| *H01M 10/28* | (2006.01) | |
| *H01M 10/48* | (2006.01) | |
| *H01M 4/24* | (2006.01) | |

(52) U.S. Cl.
CPC ............ *H01M 10/26* (2013.01); *H01M 4/24* (2013.01); *H01M 10/28* (2013.01); *H01M 10/48* (2013.01); *H01M 2300/0014* (2013.01)

(58) Field of Classification Search
None
See application file for complete search history.

(56) References Cited

U.S. PATENT DOCUMENTS

| | | |
|---|---|---|
| 7,550,230 B2 | 6/2009 | Phillips et al. |
| 2015/0010833 A1* | 1/2015 | Amendola ............... H01M 4/38 |
| | | 429/406 |
| 2018/0013185 A1 | 1/2018 | Adamson et al. |
| 2018/0019475 A1* | 1/2018 | Adamson ............... H01M 50/46 |
| 2018/0316031 A1* | 11/2018 | Song ........................ H01M 8/18 |

FOREIGN PATENT DOCUMENTS

| | | |
|---|---|---|
| EP | 3467932 A1 | 4/2019 |
| JP | 2007214125 A | 8/2007 |
| JP | 2015185259 A | 10/2015 |
| JP | 2018037290 A | 3/2018 |
| WO | 2017172878 A1 | 10/2017 |
| WO | 2017209100 A1 | 12/2017 |

OTHER PUBLICATIONS

Ito, Y, et al. "Zinc morphology in zinc-nickel flow assisted batteries and impact on performance," Journal of Power Sources, 2011, vol. 196, pp. 2340-2345.

* cited by examiner

*Primary Examiner* — Christopher P Domone
(74) *Attorney, Agent, or Firm* — Duane Morris LLP

(57) ABSTRACT

A flow battery according to an embodiment includes a cathode and an anode, an electrolytic solution, and a flow device. The electrolytic solution includes an indium component and a halogen species and contacts the cathode and the anode. The flow device causes the electrolytic solution to flow.

10 Claims, 3 Drawing Sheets

FLOW BATTERY, FLOW BATTERY SYSTEM, AND CONTROL METHOD

CROSS-REFERENCE TO RELATED APPLICATION(S)

This application is a national stage application of International Application No. PCT/JP2019/018074 filed on Apr. 26, 2019, which designates the United States, the entire contents of which are herein incorporated by reference, and which is based upon and claims the benefit of priority to Japanese Patent Application No. 2018-087778 filed on Apr. 27, 2018, the entire contents of which are herein incorporated by reference.

FIELD

A disclosed embodiment(s) relate(s) to a flow battery, a flow battery system, and a control method.

BACKGROUND

A flow battery has conventionally been known that circulates an electrolytic solution that contains a tetrahydroxyzincate ion(s) ($[Zn(OH)_4]^{2-}$), between a cathode and an anode (see, for example, Non Patent Literature 1).

Furthermore, a technique has been proposed that covers an anode that includes an active material such as a zinc species, with an ion conductive layer that has a selective ion conductivity, so as to suppress growth of a dendrite (see, for example, Patent Literature 1).

CITATION LIST

Patent Literature

Patent Literature 1: Japanese Patent Application Publication No. 2015-185259

Non Patent Literature

Non Patent Literature 1: Y. Ito. et al.: Zinc morphology in zinc-nickel flow assisted batteries and impact on performance, journal of Power Sources, Vol. 196, pp. 2340-2345, 2011

SUMMARY

A flow battery according to an aspect of an embodiment includes a cathode and an anode, an electrolytic solution, and a flow device. The electrolytic solution includes an indium component and a halogen species and contacts the cathode and the anode. The flow device causes the electrolytic solution to flow.

DESCRIPTION OF EMBODIMENTS

Hereinafter, an embodiment(s) of a flow battery, a flow battery system, and a control method as disclosed in the present application will be explained in detail, with reference to the accompanying drawing(s). Additionally, this invention is not limited by an embodiment(s) as illustrated below.

First Embodiment

Figure 1:
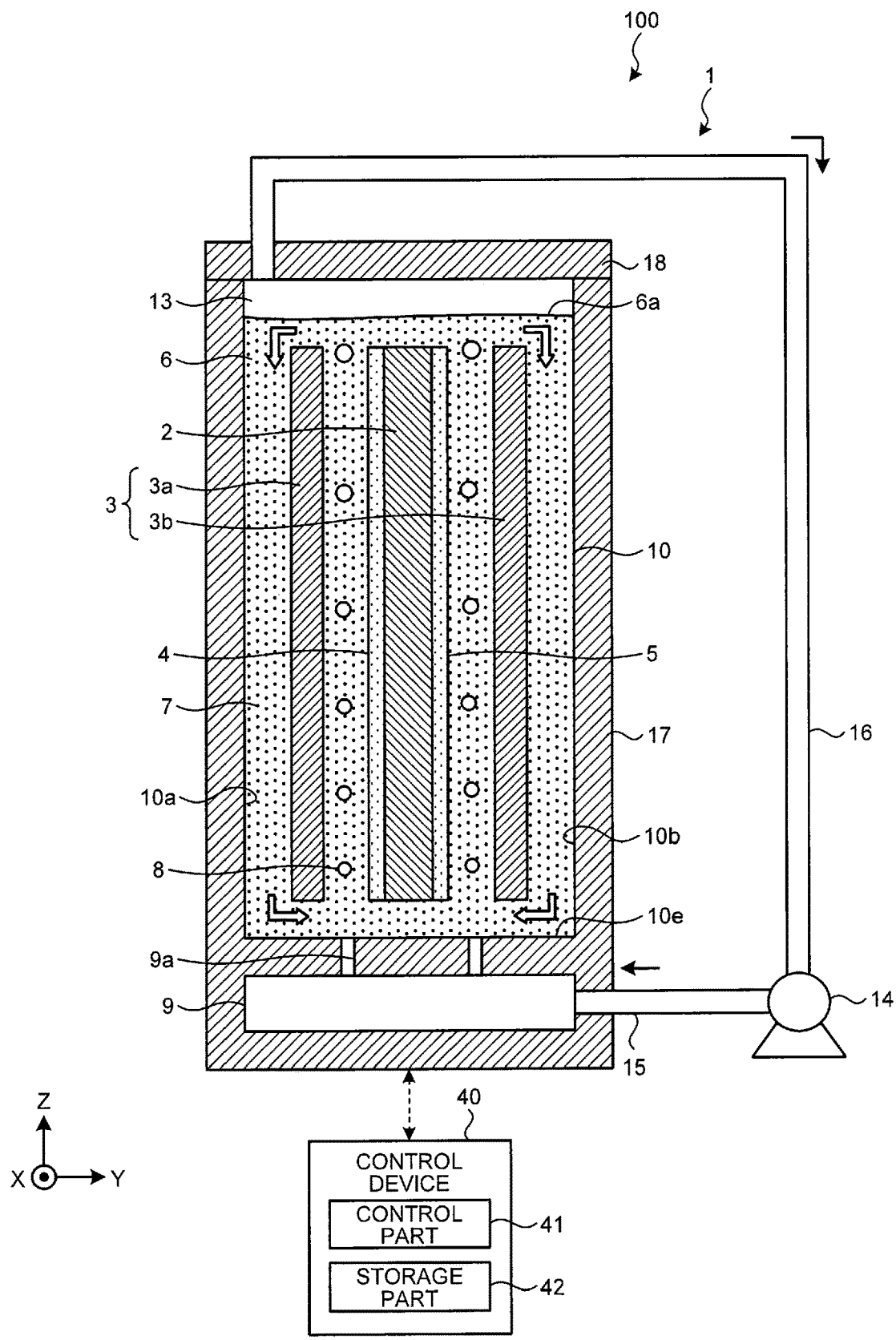
FIG. 1 is a diagram that illustrates an outline of a flow battery system according to a first embodiment.

FIG. 1 is a diagram that illustrates an outline of a flow battery system according to a first embodiment. A flow battery system 100 as illustrated in FIG. 1 includes a flow battery 1 and a control device 40. The flow battery 1 includes a reaction part 10 and a generation part 9 that are housed in a housing 17 and a supply part 14. The reaction part 10 includes a cathode 2, an anode 3, diaphragms 4, 5, an electrolytic solution 6, and a powder 7. The flow battery 1 is a device that causes a gas bubble(s) 8 that is/are generated in the generation part 9 to float up in the electrolytic solution 6, so as to cause the electrolytic solution 6 that is housed in the reaction part 10 to flow. The generation part 9 is an example of a flow device.

Additionally, FIG. 1 illustrates a three-dimensional orthogonal coordinate system that includes a Z-axis where a vertically upward direction is a positive direction and a vertically downward direction is a negative direction, in order to provide a clear explanation. Such an orthogonal coordinate system may also be illustrated in (an)other drawing(s) that is/are used for an explanation as described later. Furthermore, a component that is similar to that of the flow battery system 100 as illustrated in FIG. 1 will be provided with an identical sign so as to omit or simplify an explanation thereof.

The cathode 2 is, for example, an electrically conductive member that contains a nickel compound, a manganese compound, or a cobalt compound as a cathode active material. For a nickel compound, it is possible to use, for example, nickel oxyhydroxide, nickel hydroxide, a cobalt-compound-containing nickel hydroxide, or the like. For a manganese compound, it is possible to use, for example, manganese dioxide or the like. For a cobalt compound, it is possible to use, for example, cobalt hydroxide, cobalt oxyhydroxide, or the like. Furthermore, the cathode 2 may include graphite, carbon black, an electrically conductive resin, or the like. Furthermore, the cathode 2 may be of metallic nickel, metallic cobalt, or metallic manganese, or an alloy thereof.

Furthermore, the cathode 2 includes, for example, a cathode active material as described above, an electrical conductor, or (an)other additive(s), as a plurality of granular bodies. Specifically, the cathode 2 is provided by, for example, pressing a pasty cathode material that contains a granular active material and electrical conductor that are compounded in a predetermined proportion, together with a binder that contributes to a shape retention property, into a foam metal that has an electrical conductivity such as foam nickel, molding it into a desired shape, and drying it.

The anode 3 includes an anode active material as a metal. For the anode 3, it is possible to use, for example, a metal plate of a stainless one, copper, or the like, or a stainless or copper plate with a surface that is plate-processed with nickel, tin, or zinc. Furthermore, a plate-processed surface that is partially oxidized may be used as the anode 3.

The anode 3 includes an anode 3a and an anode 3b that are arranged so as to interpose the cathode 2 therebetween and face one another. The cathode 2 and the anode 3 are arranged in such a manner that the anode 3a, the cathode 2, and the anode 3b are sequentially aligned at a predetermined interval(s) along a direction of a Y-axis. Thus, each interval between the cathode 2 and the anode 3 that are adjacent thereto is provided, so that flow paths of the electrolytic solution 6 and a gas bubble(s) 8 between the cathode 2 and the anode 3 are ensured.

The diaphragms 4, 5 are arranged so as to interpose therebetween both sides of the cathode 2 in a thickness direction thereof, that is, a direction of a Y-axis. A diaphragm 4, 5 is composed of a material that allows movement of an ion(s) that is/are included in the electrolytic solution 6. Specifically, for a material of the diaphragm 4, 5, it is possible to provide, for example, an anion conductive material in such a manner that the diaphragm 4, 5 has a hydroxide ion conductivity. For an anion conductive material, it is possible to provide, for example, a gel-like anion conductive material that has a three-dimensional structure such as an organic hydrogel, a solid polymer type anion conductive material, or the like. A solid polymer type anion conductive material includes, for example, a polymer and at least one compound that is selected from a group that is composed of an oxide, a hydroxide, a layered double hydroxide, a sulfate compound, and a phosphate compound that contain at least one kind of element that is selected from Group 1 to Group 17 of a periodic table.

Preferably, the diaphragm 4, 5 is composed of a compact material so as to suppress penetration of a metal ion complex such as $[Zn(OH)_4]^{2-}$ with an ionic radius that is greater than that of a hydroxide ion and has a predetermined thickness. For a compact material, it is possible to provide, for example, a material that has a relative density of 90% or greater, more preferably 92% or greater, and even more preferably 95% or greater, that is calculated by an Archimedes' method. A predetermined thickness is, for example, 10 μm to 1000 μm, and more preferably 50 μm to 500 μm.

In such a case, it is possible to reduce growing of zinc that is deposited on an anode 3a, 3b as a dendrite (a needle crystal) and penetrating thereof through the diaphragm 4, 5, at a time of charging. As a result, it is possible to reduce conduction between the anode 3 and the cathode 2 that face one another.

The electrolytic solution 6 is an alkali aqueous solution that contains 6 mol·dm$^{-3}$ or more of an alkali metal. An alkali metal is, for example, potassium. Specifically, it is possible to use, for example, a 6 to 6.7 mol·dm$^{-3}$ aqueous solution of potassium hydroxide as the electrolytic solution 6. Furthermore, an alkali metal such as lithium or sodium may be added as a hydroxide (lithium hydroxide or sodium hydroxide) for a purpose of suppression of oxygen generation.

Furthermore, the electrolytic solution 6 contains a zinc component. A zinc component is dissolved as $[Zn(OH)_4]^{2-}$ in the electrolytic solution 6. For a zinc component, it is possible to use, for example, zinc oxide or zinc hydroxide. Furthermore, it is possible to prepare the electrolytic solution 6 by adding ZnO to 1 dm$^3$ of an aqueous solution of potassium hydroxide at a proportion of 0.5 mol and adding the powder 7 as describe later thereto as needed. For example, it is possible for the electrolytic solution 6 that is unused or provided after an end of discharging to contain $1\times10^{-4}$ mol·dm$^{-3}$ or more and $5\times10^{-2}$ mol·dm$^{-3}$ or less, and preferably $1\times10^{-3}$ mol·dm$^{-3}$ or more and $2.5\times10^{-2}$ mol·dm$^{-3}$ or less, of a zinc component.

Furthermore, the electrolytic solution 6 includes an indium component. An indium component is dissolved as $[In(OH)_4]^{-}$ in the electrolytic solution 6 that is an alkali aqueous solution. For an indium component, it is possible to use an indium halide, for example, indium chloride ($InCl_3$) or indium fluoride ($InF_3$). Furthermore, an indium component is not limited to one as described above as long as it is possible to dissolve it in the electrolytic solution 6, and for example, indium oxide or indium hydroxide that is preliminarily dissolved in hydrochloric acid or another component may be used. For example, it is possible for the electrolytic solution 6 that is unused or provided after an end of discharging to contain $1\times10^{-4}$ mol·dm$^{-3}$ or more and $5\times10^{-2}$ mol·dm$^{-3}$ or less, and preferably $1\times10^{-3}$ mol·dm$^{-3}$ or more and $2.5\times10^{-2}$ mol·dm$^{-3}$ or less, of an indium component. Thus, as the electrolytic solution 6 includes an indium component, zinc that is deposited on the abode 3 by charging does not readily grow as a dendrite, so that it is possible to reduce conduction between an anode and a cathode.

Furthermore, the electrolytic solution 6 includes a halogen species. A halogen species is dissolved as a halide ion ($X^-$) in the electrolytic solution 6 and contributes to stabilization of an indium component that is dissolved in the electrolytic solution 6. A halogen species is, for example, a chlorine component or a fluorine component. For a chlorine component, it is possible to use, for example, potassium chloride or hydrochloric acid. For a fluorine component, it is possible to use, for example, potassium fluoride or hydrofluoric acid. Furthermore, an indium halide that is an example of an indium component also functions as a halogen species that stabilizes $[In(OH)_4]^{-}$ in the electrolytic solution 6.

A halogen species is dissolved in the electrolytic solution 6 that is unused or provided after an end of discharging in such a manner that a molar mass $M_X$ of a halogen species is, for example, 3 times to 10 times a molar mass $M_{In}$ of an indium component as described above, that is, $M_X/M_{In}$ is 3 or greater and 10 or less. Thus, an amount of a compounded halogen species is specified, so that it is possible to dissolve a halogen species and an indium component in the electrolytic solution 6 stably. On the other hand, in a case where $M_X/M_{In}$ is less than 3, an indium component is readily precipitated in the electrolytic solution 6. Furthermore, in a case where $M_X/M_{In}$ is greater than 10, a halogen species is readily precipitated in the electrolytic solution 6. Additionally, in a case where the electrolytic solution 6 includes only an indium halide (indium chloride ($InCl_3$) or indium fluoride ($InF_3$)) as an indium component, $M_X/M_{In}$ is "3".

The powder 7 includes zinc or indium. The powder 7 that is added to the electrolytic solution 6 may be any of only a powder 7 that includes zinc, only a powder 7 that includes indium, both a powder 7 that includes zinc and a powder 7 that includes indium, and a powder 7 that includes both zinc and indium. Furthermore, such powders 7 may be combined.

The powder 7 that includes zinc is, for example, zinc oxide, zinc hydroxide, or the like that is processed into or produced in a powder form. Although the powder 7 is readily dissolved in an alkali aqueous solution, it is not dissolved in the electrolytic solution 6 that is saturated with a zinc species but is dispersed or floats therein and is mixed in the electrolytic solution 6 in a state where a part thereof is precipitated. In a case where the electrolytic solution 6 is left to stand for a long period of time, a state where most of the powder 7 is precipitated in the electrolytic solution 6 may be provided, and as convection or the like is caused in the electrolytic solution 6, a state where a part of the precipitated powder 7 is dispersed or floats in the electrolytic solution 6 is provided. That is, the powder 7 is present in the electrolytic solution 6 so as to be moveable. Additionally, "movable" herein does not indicate that it is possible for the powder 7 to move in only a local space that is produced between it and another surrounding powder 7, but indicates that the powder 7 moves to another position in the electrolytic solution 6 so that the powder 7 is exposed to the electrolytic solution 6 other than that at an original position thereof. Moreover, a category of "movable" includes the powder 7 that is capable of moving to neighborhood of both the cathode 2 and the anode 3 or the powder 7 that is capable of moving to almost everywhere in the electrolytic solution 6 that is present in the housing 17. As $[Zn(OH)_4]^{2-}$ that is dissolved in the electrolytic solution 6 is consumed, the powder 7 that is mixed in the electrolytic solution 6 is dissolved in such a manner that $[Zn(OH)_4]^{2-}$ that is dissolved in the electrolytic solution 6 approaches a saturation concentration thereof so that the powder 7 and the electrolytic solution 6 mutually maintain an equilibrium state thereof.

The powder 7 that includes indium is, for example, indium oxide, indium hydroxide, or the like that is processed into or produced in a powder form. Although the powder 7 is partially dissolved in an alkali aqueous solution, it is not dissolved in the electrolytic solution 6 that is saturated with an indium species but is dispersed or floats therein and is mixed in the electrolytic solution 6 in a state where a part thereof is precipitated. In a case where the electrolytic solution 6 is left to stand for a long period of time, a state where most of the powder 7 is precipitated in the electrolytic solution 6 may be provided, and as convection or the like is caused in the electrolytic solution 6, a state where a part of the precipitated powder 7 is dispersed or floats in the electrolytic solution 6 is provided. That is, the powder 7 is present in the electrolytic solution 6 so as to be movable. Additionally, "movable" herein does not indicate that it is possible for the powder 7 to move in only a local space that is produced between it and another surrounding powder 7, but indicates that the powder 7 moves to another position in the electrolytic solution 6 so that the powder 7 is exposed to the electrolytic solution 6 other than that at an original position thereof. Moreover, a category of "movable" includes the powder 7 that is capable of moving to neighborhood of both the cathode 2 and the anode 3 or the powder 7 that is capable of moving to almost everywhere in the electrolytic solution 6 that is present in the housing 17. As $[In(OH)_4]^{2-}$ that is dissolved in the electrolytic solution 6 is consumed, the powder 7 that is mixed in the electrolytic solution 6 is dissolved in such a manner that $[In(OH)_4]^{2-}$ that is dissolved in the electrolytic solution 6 approaches a saturation concentration thereof so that the powder 7 and the electrolytic solution 6 mutually maintain an equilibrium state thereof.

An indium component in the electrolytic solution 6 is deposited on the anode 3a, 3b together with a zinc species at a time of charging. A zinc species in the electrolytic solution 6 that is decreased by charging is supplied from the powder 7 that includes zinc and an indium component in the electrolytic solution 6 that is decreased by charging is supplied from the powder 7 that includes indium, so that a state where zinc is difficult to grow as a dendrite is readily maintained.

In the powder 7 that includes indium to be added, a proportion of an indium element per an amount of the electrolytic solution 6 may be $5 \times 10^{-3}$ mol·dm$^{-3}$ or more and 0.1 mol·dm$^{-3}$ or less as. Such an amount of indium is an amount that is added separately from an indium component that is added when the electrolytic solution 6 is fabricated.

An amount of the powder 7 that includes indium is $5 \times 10^{-3}$ mol·dm$^{-3}$ or more, so that it is possible to be difficult to grow a dendrite as described above. An amount of the powder 7 that includes indium that is first added is $1 \times 10^{-2}$ mol·dm$^{-3}$ or more, and is further, $2.5 \times 10^{-2}$ mol·dm$^{-3}$ or more, it is possible to be difficult to grow a dendrite even in a case where an amount of the powder 7 that includes zinc is decreased by repeating charging and discharging.

The powder 7 that includes indium is comparatively readily attached to the anode 3a, 3b or the like. As attachment is caused, a gap between electrodes is decreased, so that a possibility of causing a short circuit is increased. An amount of the powder 7 that includes indium is $5 \times 10^{-2}$ mol·dm$^{-3}$ or less, so that it is possible to decrease a possibility of a short circuit.

A gas bubble(s) 8 is/are composed of, for example, a gas that is inert against the cathode 2, the anode 3, and the electrolytic solution 6. For such a gas, it is possible to provide, for example, a nitrogen gas, a helium gas, a neon gas, an argon gas, or the like. A gas bubble(s) 8 of a gas that is inert against the electrolytic solution 6 is/are generated, so that it is possible to reduce modification of the electrolytic solution 6. Furthermore, for example, degradation of the electrolytic solution 6 that is an alkali aqueous solution that contains a zinc species is reduced, so that it is possible to maintain a high ion conductivity of the electrolytic solution 6. Additionally, a gas may contain air.

Each of a gas bubble(s) 8 that is/are generated by a gas that is supplied from the generation part 9 to the electrolytic solution 6 floats up in the electrolytic solution 6, between electrodes that are arranged at a predetermined interval(s), and more specifically, between the anode 3a and the cathode 2 and between the cathode 2 and the anode 3b. A gas that floats up as a gas bubble(s) 8 in the electrolytic solution 6 disappears on a liquid level 6a of the electrolytic solution 6 and composes a gas layer 13 between an upper plate 18 and the liquid level 6a of the electrolytic solution 6.

Herein, an electrode reaction in the flow battery 1 will be explained by providing, as an example, a nickel-zinc battery where nickel hydroxide is applied as a cathode active material. Each of reaction formulas on the cathode 2 and the anode 3 at a time of charging is as follows.

Cathode: $Ni(OH)_2 + OH^- \rightarrow NiOOH + H_2O + e^-$

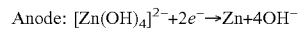
Anode: $[Zn(OH)_4]^{2-} + 2e^- \rightarrow Zn + 4OH^-$

In general, there is concern that a dendrite that is produced on the anode 3 in association with such a reaction grows to a side of the cathode 2 so that conduction between the cathode 2 and the anode 4 is caused. As is clear from a reaction formula, a concentration of $[Zn(OH)_4]^{2-}$ in neighborhood of the anode 3 is decreased as zinc is deposited on the anode 3 by charging. Then, a phenomenon of decreasing of a concentration of $[Zn(OH)_4]^{2-}$ in neighborhood of deposited zinc is a factor of growing as a dendrite. That is, $[Zn(OH)_4]^{2-}$ in the electrolytic solution 6 that is consumed at a time of charging is supplied, so that a state where a concentration of $[Zn(OH)_4]^{2-}$ that is a zinc species in the electrolytic solution 6 is high is held. Thereby, growth of a dendrite is reduced, so that a possibility of causing of conduction between the cathode 2 and the anode 3 is reduced.

In the flow battery 1, the powder 7 that includes zinc is mixed in the electrolytic solution 6 and a gas is supplied from a discharge port 9a of the generation part 9 to the electrolytic solution 6 so as to generate a gas bubble(s) 8. A gas bubble(s) 8 float(s) up in the electrolytic solution 6 from a lower side to an upper side of the housing 17 between the anode 3a and the cathode 2 and between the cathode 2 and the anode 3b, respectively.

Furthermore, an upward liquid flow is generated in the electrolytic solution 6 in association with floating up of a gas bubble(s) 8 as described above between electrodes, so that the electrolytic solution 6 flows upward from a side of an inside bottom 10e of the reaction part 10 between the anode 3a and the cathode 2 and between the cathode 2 and the anode 3b. Then, a downward liquid flow is generated mainly between an inner wall 10a of the reaction part 10 and the anode 3a and between an inner wall 10b thereof and the anode 3b, in association with an upward liquid flow of the electrolytic solution 6, so that the electrolytic solution 6 flows from an upper side to a lower side inside the reaction part 10.

Thereby, as $[Zn(OH)_4]^{2-}$ in the electrolytic solution 6 is consumed by charging, zinc in the powder 7 is dissolved so as to follow it, so that the electrolytic solution 6 that contains a high concentration of $[Zn(OH)_4]^{2-}$ is supplied to neighborhood of the anode 3. Hence, it is possible to hold a state where a concentration of $[Zn(OH)_4]^{2-}$ in the electrolytic solution 6 is high, so that it is possible to reduce a possibility of conduction between the cathode 2 and the anode 3 in association with growth of a dendrite.

Additionally, for the powder 7, it is possible to provide metallic zinc, calcium zincate, zinc carbonate, zinc sulfate, zinc chloride, or the like, other than zinc oxide and zinc hydroxide, where zinc oxide and zinc hydroxide are preferable.

Furthermore, although Zn is consumed on the anode 3 by charging so as to produce $[Zn(OH)_4]^{2-}$, the electrolytic solution 6 is already in a saturated state thereof, so that ZnO is precipitated from $[Zn(OH)_4]^{2-}$ that is excessive in the electrolytic solution 6. Herein, zinc that is consumed on the anode 3 is zinc that is deposited on a surface of the anode 3 at a time of charging. Hence, a so-called shape change where a surface shape of the anode 3 is changed is not caused, differently from a case where charging and discharging are repeated by using an anode that originally contains a zinc species. Thereby, in the flow battery 1 according to a first embodiment, it is possible to reduce time degradation of the anode 3. Additionally, $Zn(OH)_2$ or a mixture of ZnO and $Zn(OH)_2$ is precipitated from $[Zn(OH)_4]^{2-}$ that is excessive, depending on a state of the electrolytic solution 6.

As described above, a state where a concentration of $[Zn(OH)_4]^{2-}$ in the electrolytic solution 6 is high is held on the anode 3, so that growth of a dendrite is reduced. However, as the electrolytic solution 6 that contains $[Zn(OH)_4]^{2-}$ in a saturated state or at a high concentration at a time of charging is retained in neighborhood of the anode 3, zinc that is precipitated in a mossy state may be attached to a surface of the anode 3. Zinc that is precipitated in a mossy state is bulky as compared with, for example, zinc that is precipitated at an ordinary time where a bulk density thereof is about 4120 $kg \cdot m^{-3}$, so that a gap between the cathode 2 and the anode 3 is decreased, and a flow of a gas bubble(s) 8 or the electrolytic solution 6 is blocked, so that the electrolytic solution 6 that is housed in the reaction part 10 is readily retained. Furthermore, as zinc in a mossy state that is deposited on the anode 3 reaches the cathode 2, conduction between the anode 3 and the cathode 2 is caused.

Hence, in the flow battery system 100 according to a first embodiment, the electrolytic solution 6 that contains an indium component and a halogen species as described above is applied thereto and a control device 40 is included therein. Such a control device 40 has a control part 41 that controls charging of the flow battery 1 and a storage part 42.

The control part 41 includes, for example, a computer that has a CPU (a Central Processing Unit), a ROM (a Read Only Memory), a RAM (a Random Access Memory), an HDD (a Hard Disk Drive), an input/output port, and the like, and various types of circuits. A CPU of such a computer reads and executes, for example, a program that is stored in an ROM, so as to function as the control part 41.

Furthermore, it is also possible to provide the control part 41 that is composed of hardware such as an ASIC (an Application Specific Integrated Circuit) or an FPGA (a Field Programmable Gate Array).

Furthermore, the storage part 42 corresponds to, for example, an ROM and an HDD. It is possible for an ROM and an HDD to store various types of setting information in the control device 40. Additionally, the control part 41 may acquire various types of information through another computer that is connected by a wired or wireless network or a portable recording medium.

The control device 40 executes, for the flow battery 1, charging control that is dependent on a composition of the electrolytic solution 6, so that conduction between an anode and a cathode is further reduced. Such a point will further be explained with reference to FIG. 2.

Figure 2:
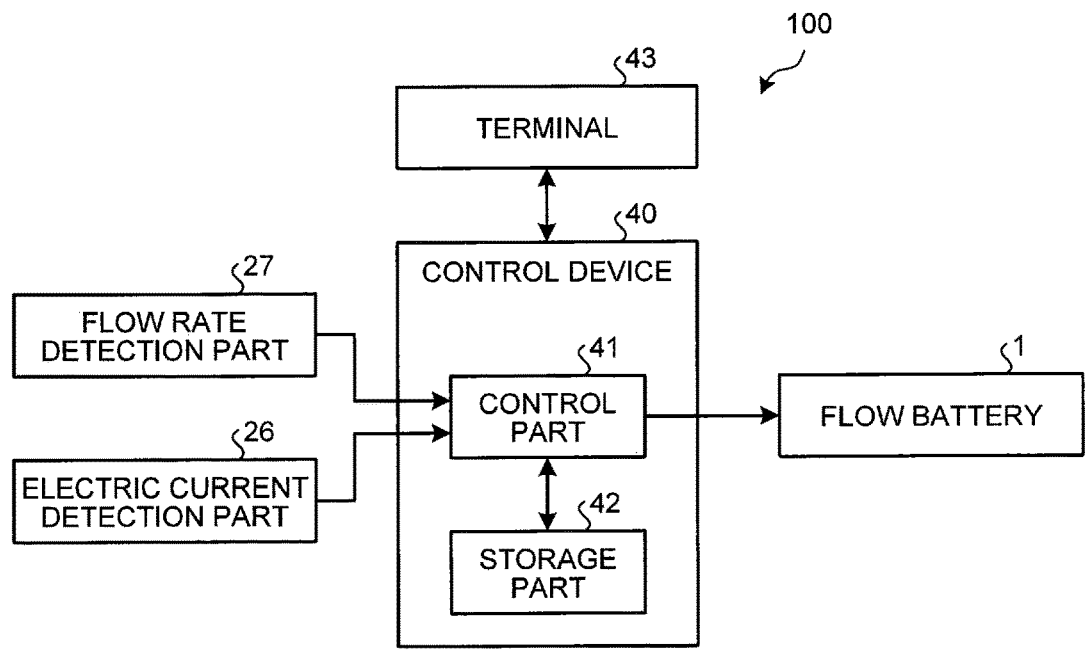
FIG. 2 is a block diagram that illustrates a functional configuration of a flow battery system according to a first embodiment.

FIG. 2 is a block diagram that illustrates a functional configuration of a flow battery system according to a first embodiment. As illustrated in FIG. 2, a flow battery system 100 has an electric current detection part 26 and a flow rate detection part 27 in addition to the flow battery 1 and the control device 40 as described above.

The electric current detection part 26 detects a charging electric current that is measured at a time of charging of the flow battery 1 and transmits information of such a charging electric current to the control part 41. The flow rate detection part 27 detects a flow rate of the electrolytic solution 6 that flows in between the cathode 2 and the anode 3 at a time of charging and transmits information of such a flow rate to the control part 41. The flow rate detection part 27 is, for example, a flowmeter that detects each of flow rates of the electrolytic solution 6 that flows in between the anode 3a and the diaphragm 4 and between the diaphragm 5 and the anode 3b, respectively. For a flowmeter, it is possible to utilize, for example, a mechanical one, a sonic one, an electromagnetic one, an optical one, or the like. Furthermore, a PIV (a Particle Image Velocimetry) that preliminarily mixes, into the electrolytic solution 6, and takes a photograph of, a marker particle(s) that move(s) at a velocity that is identical to that of the electrolytic solution 6 may be applied thereto as the electric current detection part 26.

Then, the control part 41 controls charging of the flow battery 1 based on information that is sent from the electric current detection part 26 and the flow rate detection part 27 and setting information that is stored in the storage part 42. Specifically, the control part 41 controls charging of the flow battery 1 in such a manner that an electric current density I (unit: $[mA \cdot cm^{-2}]$) on the anode 3 that is calculated based on information that is acquired from the electric current detection part 26 and a flow rate R (unit: $[cm \cdot sec^{-1}]$) of the electrolytic solution 6 that is acquired from the flow rate detection part 27 satisfy a relationship of $1 \leq C_{Zn} \times R^{1/3} \times C_{In}^{-1} \times I^{-1} \leq 150$. Herein, $C_{Zn}$ and $C_{In}$ are molar concentrations (unit: $[mol \cdot dm^{-3}]$) of a zinc component and an indium component that are included in the electrolytic solution 6 that is unused or provided after an end of discharging, respectively. Furthermore, in an example as illustrated in FIG. 1, an electric current density I is an average value of electric current densities that are respectively calculated for the anodes 3a, 3b. Similarly, a flow rate R is an average value of flow rates of the electrolytic solution 6 that flows in between the anode 3a and the diaphragm 4 and between the diaphragm 5 and the anode 3b, respectively.

A relational expression $(C_{Zn} \times R^{1/3} \times C_{In}^{-1} \times I^{-1})$ as described above is a factor that is an index for supplying $[Zn(OH)_4]^{2-}$ that is consumed at a time of charging of the flow battery 1, and will be represented as a zinc supplement factor ($F_{Zn}$) below. For example, $F_{Zn}$ increases as a flow rate R increases. Furthermore, $F_{Zn}$ decreases as an electric current density I increases. $F_{Zn}$ that has such a relationship accurately represents a balance between consumption and supplement of $[Zn(OH)_4]^{2-}$ on the abode 3 and in neighborhood thereof at a time of charging of the flow battery 1 by using a flow rate R and an electric current density I.

$F_{Zn}$ is 1 or greater and 150 or less, preferably 3.5 or greater and 50 or less, and further 5 or greater and 25 or less, so that a balance between consumption and supplement of $[Zn(OH)_4]^{2-}$ at a time of charging is held appropriately and deposition of zinc in a dendritic state or a mossy state on a surface of the anode 3 is reduced. Hence, a problem of causing of conduction between the anode 3 and the cathode 2 is reduced. On the other hand, if $F_{Zn}$ is less than 1, supplement of $[Zn(OH)_4]^{2-}$ in neighborhood of the anode 3 is insufficient, and a dendrite is produced so that conduction between the anode 3 and the cathode 2 is readily caused. Furthermore, if $F_{Zn}$ is greater than 150, $[Zn(OH)_4]^{2-}$ is excessively supplied in neighborhood of the anode 3, and zinc in a mossy state is deposited on a surface of the anode 3 so that conduction between the anode 3 and the cathode 2 is readily caused. Additionally, it is possible to control a flow rate R of the electrolytic solution 6 by adjusting an amount of a discharged gas that is supplied from the discharge port 9a of the generation part 9 into the electrolytic solution 6, per unit time.

The flow battery 1 that is included in the flow battery system 100 according to a first embodiment will further be explained. The generation part 9 is arranged below the reaction part 10. An inside of the generation part 9 is hollow in such a manner that a gas that is supplied from the supply part 14 as described later is stored temporarily. Furthermore, the inside bottom 10e of the reaction part 10 is arranged so as to cover a hollow part of the generation part 9 and also serves as a top plate of the generation part 9.

Furthermore, the inside bottom 10e has a plurality of discharge ports 9a that are aligned along a direction of an X-axis and a direction of a Y-axis. The generation part 9 discharges, from the discharge port(s) 9a, a gas that is supplied from the supply part 14, so that a gas bubble(s) 8 is/are generated in the electrolytic solution 6. The discharge port 9a has, for example, a diameter of 0.05 mm or greater and 0.5 mm or less. A diameter of the discharge port 9a is thus specified, so that it is possible to reduce a problem of penetrating of the electrolytic solution 6 or the powder 7 from the discharge port 9a into a hollow part inside the generation part 9. Furthermore, it is possible to provide a gas that is discharged from the discharge port 9a with a pressure loss that is suitable for generating a gas bubble(s) 8.

Furthermore, an interval (a pitch) of the discharge ports 9a along a direction of an X-axis is, for example, 2.5 mm or greater and 50 mm or less, and further, may be 10 mm or less. However, a size(s) or an interval between the discharge ports 9 is/are not limited as long as they are arranged in such a manner that it is possible to cause a generated gas bubble(s) 8 to flow respectively and appropriately between the cathode 2 and the anode 3 that face one another.

The housing 17 and the upper plate 18 are composed of, for example, a resin material that has an alkali resistance and an insulation property such as polystyrene, polypropylene, polyethylene terephthalate, polytetrafluoroethylene, or polyvinyl chloride. The housing 17 and the upper plate 18 are preferably composed of mutually identical materials and may be composed of different materials. Furthermore, the generation part 9 may be arranged inside the reaction part 10.

The supply part 14 supplies a gas that is recovered from an inside of the housing 17 through a pipe 16, to the generation part 9 through a pipe 15. The supply part 14 is, for example, a pump that is capable of transferring a gas (a gas pump), a compressor, or a blower. If a gas tightness of the supply part 14 is increased, degradation of an electrical power generation performance of the flow battery 1 that is caused by leaking a water vapor that originates from a gas or the electrolytic solution 6 to an outside thereof is not readily caused. Furthermore, a (non-illustrated) regulation valve for regulating an amount of a gas that is discharged per unit time from the discharge ports 9a may be provided between the supply part 14 and the generation part 9. For example, it is possible to provide such a regulation valve that is configured to be driven based on a control signal from the control part 41.

Figure 3:
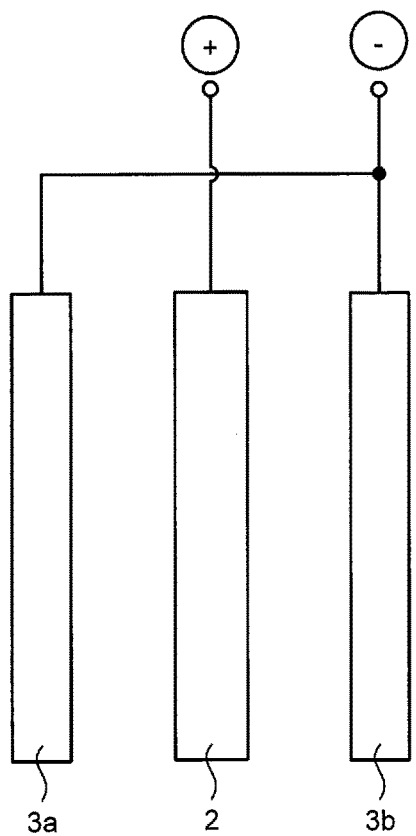
FIG. 3 is a diagram that explains an example of connection between electrodes of a flow battery that is included in a flow battery system according to a first embodiment.

Next, connection between electrodes in the flow battery 1 will be explained. FIG. 3 is a diagram that explains an example of connection between electrodes of a flow battery that is included in a flow battery system according to a first embodiment.

As illustrated in FIG. 3, an anode 3a and an anode 3b are connected in parallel. Thus, anodes 3 are connected in parallel, so that it is possible to connect and use respective electrodes of the flow battery 1 appropriately even in a case where total numbers of a cathode(s) 2 and an anode(s) 3 are different.

Furthermore, as described above, the flow battery 1 includes the anodes 3a, 3b that are arranged so as to interpose a cathode 2 therebetween and face one another. Thus, in the flow battery 1 where the two anodes 3a, 3b correspond to the one cathode 2, an electric current density per one anode is decreased as compared with a flow battery where a cathode 2 and an anode 3 correspond at 1:1. Hence, production of a dendrite on the anode 3a, 3b is further reduced in the flow battery 1 according to a first embodiment, so that it is possible to further reduce conduction between the anode 3a, 3b and the cathode 2.

Additionally, although three electrodes in total in the flow battery 1 as illustrated in FIG. 1 are configured in such a manner that the anodes 3 and the cathode 2 are arranged alternately, this is not limiting, so that five or more electrodes may be arranged alternately and each of a cathode 2 and an anode 3 may be arranged one by one. Furthermore, although the flow battery 1 as illustrated in FIG. 1 is configured in such a manner that both ends thereof are the anodes 3, this is not limiting, and a configuration may be provided in such a manner that both ends thereof are cathodes 2. Moreover, an identical number of an anode(s) 3 and a cathode(s) 2 may be arranged respectively and alternately in such a manner that one end part is a cathode 2 and another end part is an anode 3.

Second Embodiment

Figure 4:
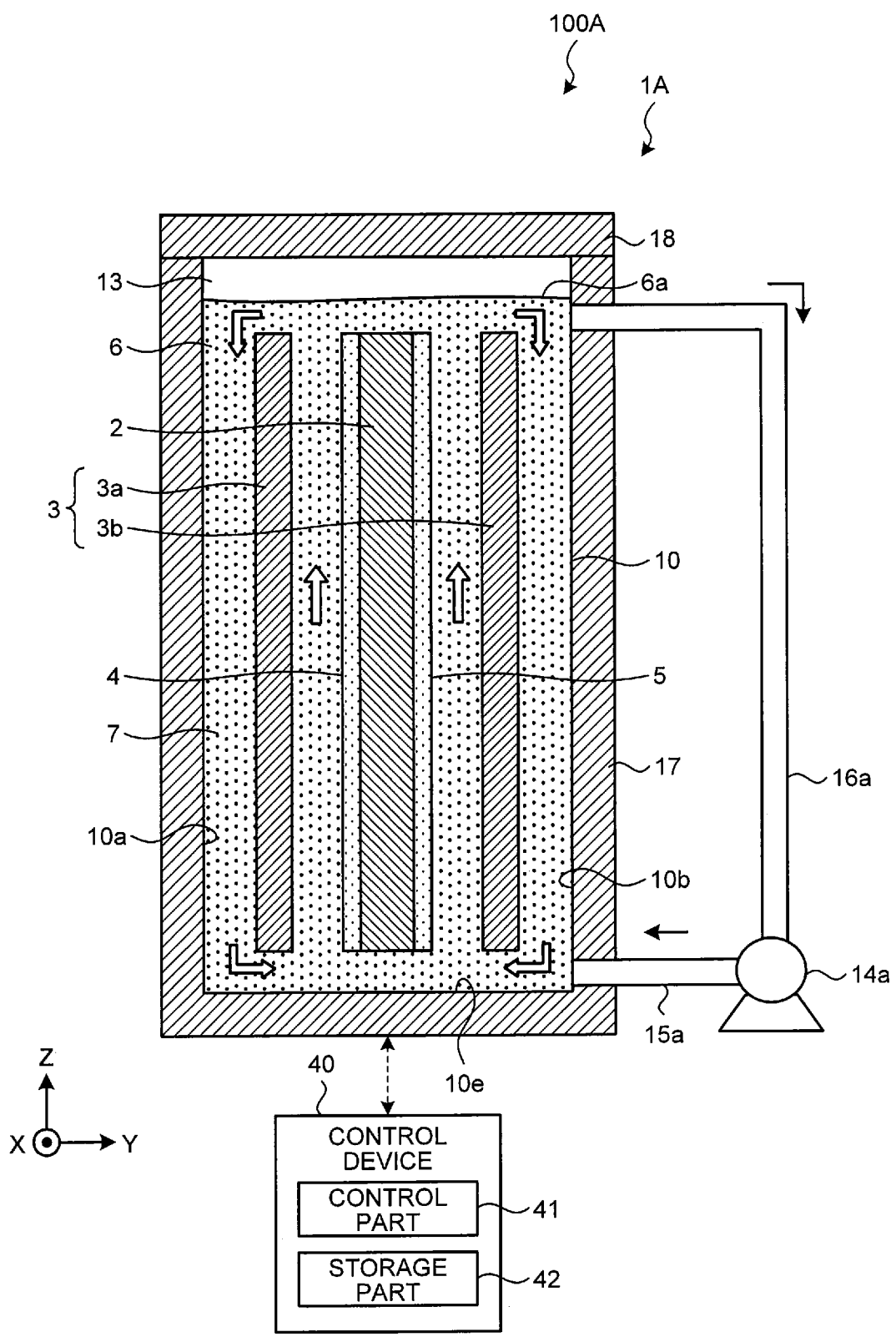
FIG. 4 is a diagram that illustrates an outline of a flow battery system according to a second embodiment.

FIG. 4 is a diagram that illustrates an outline of a flow battery system according to a second embodiment. A flow battery 1A that is included in a flow battery system 100A as illustrated in FIG. 4 has a configuration that is similar to that of the flow battery 1 that is included in the flow battery system 100 according to the first embodiment, except that a supply part 14a and pipes 15a, 16a are included instead of the generation part 9, the supply part 14, and the pipes 15, 16 as illustrated in FIG. 1.

The supply part 14a supplies an electrolytic solution 6 that is provided with a powder 7 that is mixed therein and that is recovered from an inside of a housing 17 through the pipe 16a, to a bottom of the housing 17 through the pipe 15a. The supply part 14a is an example of a flow device.

The supply part 14a is, for example, a pump that is capable of transferring the electrolytic solution 6. If a gas tightness of the supply part 14a is increased, degradation of an electric power generation performance of the flow battery 1A that is caused by leaking the powder 7 and the electrolytic solution 6 to an outside thereof is not readily caused. Then, the electrolytic solution 6 that is sent to an inside of the housing 17 contributes to a charging or discharging reaction while flowing upward between respective electrodes, similarly to the flow battery 1 according to the first embodiment.

Thus, also in the flow battery system 100A that includes the flow battery 1A that does not have the generation part 9, a control part 41 controls charging of the flow battery 1A based on amounts of an indium component and a zinc component that are contained in the electrolytic solution 6, so that a balance between consumption and supplement of $[Zn(OH)_4]^{2-}$ at a time of charging is held appropriately and deposition of zinc in a dendritic state or a mossy state on a surface of the anode 3 is reduced. Hence, in the flow battery 1A according to a second embodiment, for example, a problem of causing of conduction between the anode 3 and the cathode 2 is reduced.

Additionally, although an opening that is connected to the pipe 16a is provided on an inner wall 10b that faces a principal surface of each electrode, that is, an end part of a reaction part 10 on a side of a direction of a Y-axis in the flow battery 1A as illustrated in FIG. 4, this is not limiting and it may be provided on an end part on a side of a direction of an X-axis.

Furthermore, although the supply part 14a supplies the electrolytic solution 6 where the powder 7 is mixed therein in the flow battery 1A as illustrated in FIG. 4, this is not limiting and only the electrolytic solution 6 may be supplied. In such a case, for example, a tank that temporarily stores the electrolytic solution 6 where the powder 7 is mixed therein may be provided in a middle of the pipe 16a so as to adjust concentration of $[Zn(OH)_4]^{2-}$ that is dissolved in the electrolytic solution 6, in an inside of the tank.

Although an embodiment(s) of the present invention has/have been explained above, the present invention is not limited to an embodiment(s) as described above and a variety of modifications are possible as long as it does not depart from a spirit thereof. For example, although each embodiment as described above has been explained in such a manner that the powder 7 is mixed in the electrolytic solution 6, this is not limiting and it does not have to have the powder 7. In such a case, a zinc component that is dissolved in the electrolytic solution 6 may be in a saturated state thereof or a concentration thereof may be less than that of such a saturated state thereof. Moreover, the electrolytic solution 6 may be provided in such a manner that a zinc component is dissolved therein so as to provide a supersaturated state thereof. Furthermore, from a viewpoint of quick supplying of the electrolytic solution 6 that contains a high concentration of $[Zn(OH)_4]^{2-}$ between the cathode 2 and the anode 3, an amount of the electrolytic solution 6 may be adjusted in such a manner that upper ends of the cathode 2 and the anode 3 are arranged below a liquid level 6a of the electrolytic solution 6.

Furthermore, although each embodiment as described above has been explained in such a manner that the diaphragms 4, 5 are arranged so as to interpose both sides of the cathode 2 in a thickness direction thereof therebetween, this is not limiting and it is sufficient that they are arranged between the cathode 2 and the anode 3, and the cathode 2 may also be covered thereby.

Additionally, although the supply part 14, 14a may be operated constantly, a rate of supply of a gas or the electrolytic solution 6 at a time of discharging may be lower than that at a time of charging, from a viewpoint of reducing of electric power consumption.

Furthermore, although each embodiment as described above has been explained in such a manner that the control part 41 controls charging of the flow battery 1, 1A based on information that is sent from the electric current detection part 26 and the flow rate detection part 27 and setting information that is stored in the storage part 42, this is not limiting and charging and discharging of the flow battery 1, 1A may be controlled similarly. Practical Examples Hereinafter, the flow battery system 100, 100A according to each embodiment as described above was fabricated and a state of deposition of zinc that is attached to a surface of the anode 3 by charging was evaluated. Results are illustrated in Table 1.

TABLE 1

| | $C_{Zn}$ [mol · $dm^{-3}$] | $C_{In}$ [mol · $dm^{-3}$] | Halogen species (X) | $C_X$ [mol · $dm^{-3}$] | Molar ratio $M_X/M_{In}$ (=$C_X/C_{In}$) | R [cm · $sec^{-1}$] | I [mA · $cm^{-2}$] | $C_{Zn} \times R^{1/3} \times C_{In}^{-1} \times I^{-1}$ | Evaluation |
|---|---|---|---|---|---|---|---|---|---|
| Experimental example 1 | 0.6 | 0.001 | Cl— | 0.003 | 3 | 0.2 | 25 | 14.0 | ⊚ |
| Experimental example 2 | 0.6 | 0.001 | Cl— | 0.003 | 3 | 0.2 | 5 | 70.2 | Δ (mossy state deposition) |
| Experimental example 3 | 0.6 | 0.025 | Cl— | 0.075 | 3 | 0.2 | 25 | 0.6 | X (dendrite) |
| Experimental example 4 | 0.6 | 0.025 | Cl— | 0.075 | 3 | 0.2 | 5 | 2.8 | Δ (dendrite) |
| Experimental example 5 | 0.6 | 0.001 | Cl— | 0.003 | 3 | 1 | 25 | 24.0 | ⊚ |
| Experimental example 6 | 0.6 | 0.001 | Cl— | 0.003 | 3 | 1 | 5 | 120.0 | Δ (mossy state deposition) |

TABLE 1-continued

| | $C_{Zn}$ [mol·dm$^{-3}$] | $C_{In}$ [mol·dm$^{-3}$] | Halogen species (X) | $C_X$ [mol·dm$^{-3}$] | Molar ratio $M_X/M_{In}$ (=$C_X/C_{In}$) | R [cm·sec$^{-1}$] | I [mA·cm$^{-2}$] | $C_{Zn} \times R^{1/3} \times C_{In}^{-1} \times I^{-1}$ | Evaluation |
|---|---|---|---|---|---|---|---|---|---|
| Experimental example 7 | 0.6 | 0.025 | Cl— | 0.075 | 3 | 1 | 25 | 1.0 | Δ (dendrite) |
| Experimental example 8 | 0.6 | 0.025 | Cl— | 0.075 | 3 | 1 | 5 | 4.8 | ◯ |
| Experimental example 9 | 0.6 | 0.001 | Cl— | 0.003 | 3 | 2 | 25 | 30.2 | ◯ |
| Experimental example 10 | 0.6 | 0.001 | Cl— | 0.003 | 3 | 2 | 5 | 151.2 | X (mossy state deposition) |
| Experimental example 11 | 0.6 | 0.025 | Cl— | 0.075 | 3 | 2 | 25 | 1.2 | Δ (dendrite) |
| Experimental example 12 | 0.6 | 0.025 | Cl— | 0.075 | 3 | 2 | 5 | 6.0 | ⊚ |
| Experimental example 13 | 0.6 | 0.001 | Cl— | 0.003 | 3 | 10 | 25 | 51.7 | Δ (mossy state deposition) |
| Experimental example 14 | 0.6 | 0.001 | Cl— | 0.003 | 3 | 10 | 5 | 258.5 | X (mossy state deposition) |
| Experimental example 15 | 0.6 | 0.025 | Cl— | 0.075 | 3 | 10 | 25 | 2.1 | Δ (dendrite) |
| Experimental example 16 | 0.6 | 0.025 | Cl— | 0.075 | 3 | 10 | 5 | 10.3 | ⊚ |
| Experimental example 17 | 0.8 | 0.001 | Cl— | 0.003 | 3 | 0.2 | 25 | 18.7 | ⊚ |
| Experimental example 18 | 0.8 | 0.001 | Cl— | 0.003 | 3 | 0.2 | 5 | 93.6 | Δ (mossy state deposition) |
| Experimental example 19 | 0.8 | 0.025 | Cl— | 0.075 | 3 | 0.2 | 25 | 0.7 | X (dendrite) |
| Experimental example 20 | 0.8 | 0.025 | Cl— | 0.075 | 3 | 0.2 | 5 | 3.7 | ◯ |
| Experimental example 21 | 0.8 | 0.001 | Cl— | 0.003 | 3 | 1 | 25 | 32.0 | ◯ |
| Experimental example 22 | 0.8 | 0.001 | Cl— | 0.003 | 3 | 1 | 5 | 160.0 | X (mossy state deposition) |
| Experimental example 23 | 0.8 | 0.025 | Cl— | 0.075 | 3 | 1 | 25 | 1.3 | Δ (dendrite) |
| Experimental example 24 | 0.8 | 0.025 | Cl— | 0.075 | 3 | 1 | 5 | 6.4 | ⊚ |
| Experimental example 25 | 0.8 | 0.001 | Cl— | 0.003 | 3 | 2 | 25 | 40.3 | ◯ |
| Experimental example 26 | 0.8 | 0.001 | Cl— | 0.003 | 3 | 2 | 5 | 201.6 | X (mossy state deposition) |
| Experimental example 27 | 0.8 | 0.025 | Cl— | 0.075 | 3 | 2 | 25 | 1.6 | Δ (dendrite) |
| Experimental example 28 | 0.8 | 0.025 | Cl— | 0.075 | 3 | 2 | 5 | 8.1 | ⊚ |
| Experimental example 29 | 0.8 | 0.001 | Cl— | 0.01 | 10 | 1 | 25 | 32.0 | ◯ |
| Experimental example 30 | 0.8 | 0.001 | Cl— | 0.01 | 10 | 1 | 5 | 160.0 | X (mossy state deposition) |
| Experimental example 31 | 0.8 | 0.025 | Cl— | 0.25 | 10 | 1 | 25 | 1.3 | Δ (dendrite) |
| Experimental example 32 | 0.8 | 0.025 | Cl— | 0.25 | 10 | 1 | 5 | 6.4 | ⊚ |
| Experimental example 33 | 0.6 | 0.001 | F— | 0.01 | 10 | 1 | 25 | 24.0 | ◯ |
| Experimental example 34 | 0.6 | 0.001 | F— | 0.01 | 10 | 1 | 5 | 120.0 | X (mossy state deposition) |
| Experimental example 35 | 0.6 | 0.025 | F— | 0.25 | 10 | 1 | 25 | 1.0 | Δ (dendrite) |
| Experimental example 36 | 0.6 | 0.025 | F— | 0.25 | 10 | 1 | 5 | 4.8 | ◯ |
| Comparative experimental example 1 | 0.6 | 0 | — | 0 | — | 1 | 25 | — | X (dendrite) |
| Comparative experimental example 2 | 0.6 | 0 | — | 0 | — | 1 | 5 | — | X (mossy state deposition) |

Additionally, in experimental examples 1 to 36, an electrolytic solution 6 was prepared and used where 6.5 mol of KOH, 0.6 mol or 0.8 mol of ZnO, and 0.001 mol or 0.025 mol of $InCl_3$ or $InF_3$ were contained in 1 $dm^3$ of a deionized water and $KCl_3$ or $KF_3$ was further added and dissolved as needed. Furthermore, in comparative experimental examples 1, 2, an electrolytic solution 6 that contains none of an indium component and a halogen species was prepared and used where 6.5 mol of KOH and 0.6 mol of ZnO were contained in 1 $dm^3$ of a deionized water. Furthermore, in Table 1, $C_{Zn}$, $C_{In}$, and $C_X$ are molar concentrations of a zinc component, an indium component, and a halogen species, at a time of preparation, that is, that were contained in an unused electrolytic solution 6, respectively. Furthermore, Table 1 also illustrates a kind of a halogen species X ($Cl^-$ or $F^-$) and a molar ratio ($M_X/M_{In}$) of a halogen species and an indium component that were contained in the electrolytic solution 6.

Furthermore, in experimental examples 1 to 36 and comparative experimental examples 1, 2, charging was executed until a battery capacity was 100%, on constant rate and constant electric current conditions where a flow rate R of the electrolytic solution 6 was 0.2 to 10 $cm \cdot sec^{-1}$ and an electric current density I was 25 $mA \cdot m^{-2}$ or 5 $mA \cdot m^{-2}$. Table 1 illustrates a relational expression ($C_{Zn} \times R^{1/3} \times C_{In}^{-1} \times I^{-1}$) and a result of evaluation after completion of charging, together with a flow rate R and an electric current density I. Additionally, the flow battery 1 was used in experimental examples 1 to 32 and comparative experimental examples 1, 2, and the flow battery 1A was used in experimental examples 33 to 36.

Furthermore, evaluation was executed on a 4-point scale in Table 1, where ⊚ is a particularly good one so that deposition of zinc in a dendritic state or a mossy state on a surface of the anode 3 was not found, ○ is a case where deposition of zinc in a dendritic state or a mossy state was slightly found, Δ is a case where deposition of zinc in a dendritic state or a mossy state was found although there was not a problem in a practical usage, and x is a case where deposition of zinc in a dendritic state or a mossy state was frequently found and it was possible to cause a problem in a practical usage. In the present practical example(s), ⊚ is a case where a maximum height of zinc that was deposited on the anode 3, with respect to a surface of the anode 3, was less than 1 μm, ○ is a case where it was 1 μm or greater and less than 10 μm, Δ is a case where it was 10 μm or greater and less than 100 μm, and x is a case where it was 100 μm or greater. On a 4-point scale evaluation as described above, ⊚, ○, and Δ are evaluations that satisfy a standard for the flow battery system 100, 100A. Additionally, an interval between the cathode 2 and the anode 3 in the practical example(s), more specifically, any of intervals between the anode 3a and the diaphragm 4 and between the diaphragm 5 and the anode 3b was 500 μm.

Furthermore, for a case where deposition of zinc in a dendritic state or a mossy state was found, a specific deposition form such as (dendrite) or (mossy state deposition) is described in combination with such a 4-point scale evaluation, in a column of evaluation in Table 1.

As illustrated in Table 1, in the flow battery 1, 1A according to an embodiment(s), the electrolytic solution 6 that includes an indium component and a halogen species is used, so that it is possible to reduce a possibility of conduction between an anode and a cathode as compared with a case where an electrolytic solution 6 that includes none of an indium component and a halogen species is used. In particular, in the flow battery system 100, 100A according to an embodiment(s), a flow rate R and an electric current density I at a time of charging are controlled in such a manner that a relational expression ($C_{Zn} \times R^{1/3} \times C_{In}^{-1} \times I^{-1}$) is provided within a predetermined range, so that it is possible to further reduce conduction between an anode and a cathode.

It is possible for a person(s) skilled in the art to readily derive an additional effect(s) and/or variation(s). Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

REFERENCE SIGNS LIST 1, 1A flow battery
2 cathode
3, 3a, 3b anode
4, 5 diaphragm
6 electrolytic solution
7 powder
8 air bubble
9 generation part
9a discharge port
10 reaction part
14, 14a supply part
17 housing
18 upper plate
40 control device
41 control part
100, 100A flow battery system

The invention claimed is:

1. A flow battery, comprising:
a cathode and an anode;
an electrolytic solution that includes an indium component, a zinc component and a halogen species and contact the cathode and the anode; and
a flow device that causes the electrolytic solution to flow, wherein
an electric current density on the anode at a time of charging and a flow rate of the electrolytic solution that flows in between the cathode and the anode are controlled based on amounts of the indium component and the zinc component that are contained in the electrolytic solution.

2. The flow battery according to claim 1, wherein the electrolytic solution is an alkali aqueous solution that contains 6 $mol \cdot dm^{-3}$ or more of an alkali metal.

3. The flow battery according to claim 1, wherein a ratio $M_X/M_{In}$ of a molar mass $M_X$ of the halogen species and a molar mass $M_{In}$ of the indium component in the electrolytic solution is 3 or greater and 10 or less.

4. The flow battery according to claim 1, wherein:
the flow device include a generation part that generates a gas bubble(s) in the electrolytic solution; and
the gas bubble(s) float(s) up between the cathode and the anode.

5. The flow battery according to claim 1, wherein the anode includes a first anode and a second anode that interpose the cathode therebetween and face one another.

6. The flow battery according to claim 1, further comprising
a powder that is mixed in the electrolytic solution to be movable therein.

7. The flow battery according to claim 6, wherein the powder includes indium.

8. A flow battery system, comprising:
the flow battery according to claim 1; and
a control part that controls the flow battery, wherein:
the control part controls charging of the flow battery based on amounts of the indium component and the zinc component that are contained in the electrolytic solution.

9. The flow battery system according to claim 8, wherein the control part controls charging of the flow battery in such a manner that an electric current density I [mA·cm$^{-2}$] on the anode and a flow rate R [cm·sec$^{-1}$] of the electrolytic solution that flows in between the cathode and the anode satisfy a relationship of $1 \leq C_{Zn} \times R^{1/3} \times C_{In}^{-1} \times I^{-1} \leq 150$ where $C_{In}$ [mol·dm$^{-3}$] is a molar concentration of the indium component that is included in the electrolytic solution and $C_{Zn}$ [mol·dm$^{-3}$] is a molar concentration of the zinc component.

10. A control method that is executed by a flow battery that includes:
a cathode and an anode;
an electrolytic solution that includes a zinc component, an indium component, and a halogen species and contacts the cathode and the anode; and
a flow device that causes the electrolytic solution to flow, wherein
an electric current density on the anode at a time of charging and a flow rate of the electrolytic solution that flows in between the cathode and the anode are controlled based on amounts of the indium component and the zinc component that are contained in the electrolytic solution.

* * * * *